United States Patent [19]

Ellinger et al.

[11] Patent Number: 5,182,953
[45] Date of Patent: Feb. 2, 1993

[54] METHOD AND APPARATUS FOR SHAFT TORQUE MEASUREMENT WITH TEMPERATURE COMPENSATION

[75] Inventors: Sylvester M. Ellinger; William B. Spillman, Jr., both of Charlotte; Douglas R. Patriquin, Middlebury, all of Vt.

[73] Assignee: Simmonds Precision Products, Inc., Akron, Ohio

[21] Appl. No.: 552,107

[22] Filed: Jul. 13, 1990

[51] Int. Cl.$^5$ .............................................. G01L 3/02
[52] U.S. Cl. .................... 73/862.335; 324/244.1
[58] Field of Search ............ 73/862.33, 862.34, 862.36; 324/175, 244.1, 207.13, 207.25

[56] References Cited

U.S. PATENT DOCUMENTS

| | | | |
|---|---|---|---|
| 3,548,649 | 12/1970 | Parkinson | 73/862.34 |
| 3,572,106 | 3/1971 | Jonas | 73/862.34 |
| 3,938,890 | 2/1976 | Flavell | 73/862.33 X |
| 3,940,979 | 3/1976 | Ward et al. | 73/862.33 |
| 3,950,987 | 4/1976 | Slezinger et al. | 73/705 X |
| 4,150,566 | 4/1979 | Loebel et al. | 73/862.34 |
| 4,414,855 | 11/1983 | Iwasaki | 73/862.36 |
| 4,520,681 | 6/1985 | Moore et al. | 73/862.34 X |
| 4,590,806 | 5/1986 | Lutton et al. | 73/862.34 |
| 4,593,555 | 6/1986 | Krutz et al. | 73/116 |
| 4,724,710 | 2/1988 | Murty | 73/862.23 |
| 4,796,463 | 1/1989 | Tsals et al. | 73/862.33 |
| 4,843,232 | 6/1989 | Emo et al. | 250/225 |
| 4,966,041 | 10/1990 | Miyazaki | 73/862.33 |

FOREIGN PATENT DOCUMENTS

| | | | |
|---|---|---|---|
| 0173433 | 9/1985 | Japan | 73/862.36 |
| 0176829 | 8/1986 | Japan | 73/862.33 |
| 0815529 | 3/1981 | U.S.S.R. | 73/862.33 |

Primary Examiner—Michael T. Razavi
Assistant Examiner—Elizabeth L. Shopbell
Attorney, Agent, or Firm—William E. Zitelli; Leonard L. Lewis

[57] ABSTRACT

An apparatus and method for measuring the torque of a rotating shaft is provided, utilizing a single sensor which provides a signal which is processed to yield a temperature compensated value of the torque applied to a rotating shaft. A magneto-optic material such as a Faraday film is positioned adjacent to the rotating shaft and is subjected to a saturating magnetic field. Ferrous elements are provided about the periphery of the rotating shaft and cause the modulation of the magnetic field applied to the magneto-optic material. The rotation of the linear polarization vector of light passing through the magneto-optic material when the material is magnetized to the saturation level changes in accordance with temperature. Thus, the amplitude of the output optical signal varies in accordance with the temperature of the shaft. The passage of the ferrous elements secured to the shaft adjacent to the magneto-optic material serves to modulate the magnetic field and thus modulates the optic signal output from the magneto-optic material. The phase changes in the modulation of the optic signal are related to the shaft twist and hence to the torque applied to the shaft. Thus, a dual parameter optic sensor that measures twist and temperature of the rotating shaft and derives a temperature compensated torque measurement results.

37 Claims, 1 Drawing Sheet

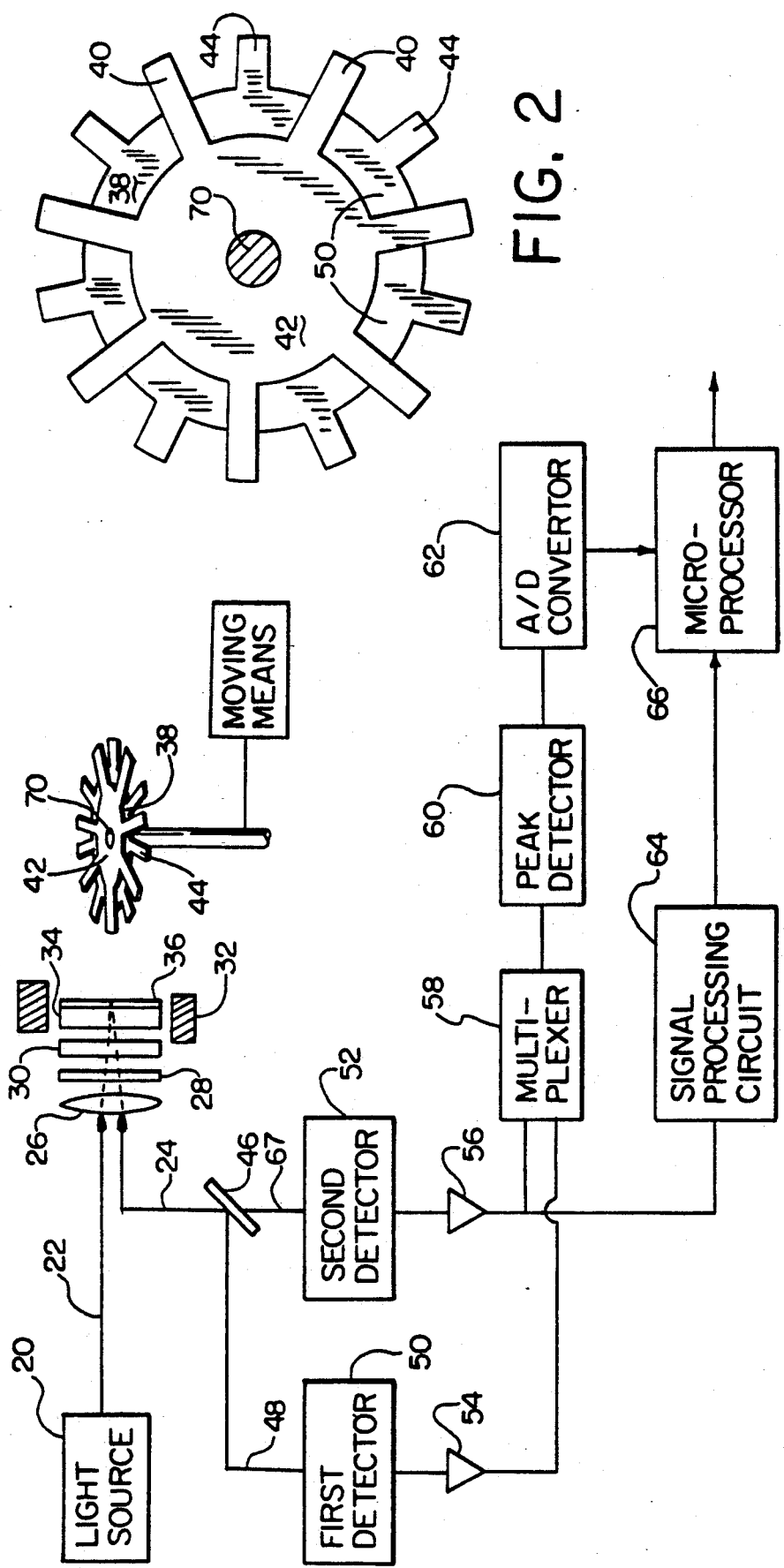

METHOD AND APPARATUS FOR SHAFT TORQUE MEASUREMENT WITH TEMPERATURE COMPENSATION

BACKGROUND OF THE INVENTION

1. Technical Field of the Invention

The present invention relates to the field of torque measurement and more particularly to a torque measuring method and apparatus, wherein temperature compensation is provided. The present invention is intended to provide a highly efficient and accurate method and apparatus for measuring the torque applied to a rotating shaft. The present invention has particular utility in measuring the torque applied to rotating shafts utilized in all sorts of machinery and particularly in aircraft engines.

2. Description of Background of Invention

In virtually every industrial application conceivable, rotating shafts are used to transmit and apply torque. In virtually all of these applications it is desired to be able to perform an accurate and efficient measurement of the torque applied to a rotating shaft. Such a torque measurement could be used to control or monitor the operation of the system in which the rotating shaft is utilized.

The purpose of such control and monitoring is quite varied. Most obviously, a measurement of the torque applied to a rotating shaft could indicate the approach of the applied torque to the design limit of the shaft and thus constitute an indicator of an impending catastrophic failure of the shaft under excessive torque. Similarly, measurement of the torque applied to a shaft can be an indication of the overstressing of the shaft and of the need to reduce the torque applied to the shaft. Overstressing of a shaft can also jeopardize the useful lifetime of the shaft by accelerating the fatigue failure of the shaft. Moreover, as the components of a torque transmission system wear with extended use, the torque necessary to drive the system changes. Thus, the variation in torque required to drive a system over an extended time period can be utilized as an indicator of excessive wear in portions of the power transmission system. For all of the above reasons and many others, it has long been known that accurate and efficient torque measurements are desirable in a wide range of industrial applications.

Indeed, the prior art contains numerous torque measuring devices applied to rotating shafts and utilizing various physical principles by which to measure torque. Thus, conventional torque sensors are known that use strain gauges as well as changes in the magnetic permeability of a material to measure torque. Differential optic sensing of torque is known, as are various capacitive mechanisms for measuring the torque applied to a shaft under load.

It is also well known that the application of torque to a shaft will result in a twisting deformation of the shaft. The amount of such twisting is directly related to the torque applied to the shaft by means of YOUNG'S modulus. Conventional torque measuring devices which measure the twist of a shaft or other drive member and utilize the measured twist as an indicator of the torque applied to the shaft or other member are also well known. However, as is well known, YOUNG'S modulus varies with changes in the temperature of the material. Thus, when measuring the twist to provide an accurate indication of the torque to which a shaft is subjected, if the torque is to be applied over a wide range of temperature, appropriate compensation must be provided for the change in YOUNG'S modulus due to temperature variation.

It has been known to provide a temperature sensor such as an RTD (resistance thermal device) near the twist sensor and to utilize the output from the RTD to provide a correction to the twist sensing-torque calculating mechanism to arrive at a temperature corrected value of the torque to which the rotating shaft is subjected. However, such a system suffers a serious drawback in that the location of the RTD is usually not identical with the location of the twist measuring sensor and thus inaccuracies in the temperature compensation are introduced. Moreover, the use of two sensing devices, i.e., the twist sensor and the thermal resistance device, increases the cost and complexity of the device.

In an environment such as a torque transmitting shaft in an aircraft engine, temperature variations are quite significant. At start-up, the ambient temperature of the shaft might be as low as $-30°$ C. while at operating conditions, the temperature of the shaft might well be in the range of $300°$ C.$-400°$ C. This broad temperature variation range results in significant inaccuracies in the torque determination based on a sensing of shaft twist, since YOUNG'S modulus varies with the operating temperature. Accordingly, there has long been a need for a torque measuring device that provides a simple and accurate compensation for variations in the temperature of the shaft.

A known torque measurement device for a rotating shaft includes two gears placed adjacent to each other but fixed to the shaft a predetermined distance apart. Thus, the degree of twist in the shaft causes an angular displacement of one of the gears with respect to the other. Thus, the teeth of the two adjacently positioned intermeshed gears approach each other as the spacing therebetween changes in accord with the torque applied to the shaft. A single sensing device is positioned at the interface between the adjacent gears and detects the change in the spacing of the gear teeth, one from each gear, as they travel past the sensor. The output of the sensor is transmitted to an electronic processing circuit which compares the displacement of, or spacing between, each pair of teeth for each rotation of the shaft. The sensing device thus identifies the change in spacing of adjacent teeth. The distance between the adjacent teeth is related to the torque being transmitted by the shaft. Thus, by detecting the change in spacing of the teeth as they travel past the sensor, the torque applied to the shaft can be measured.

SUMMARY OF THE INVENTION

The present invention solves all of the aforementioned problems in the prior art torque sensing mechanisms by providing a single torque sensor, the output signal of which can be utilized to calculate both the twist imparted to the shaft by the torque applied thereto as well as the temperature at which the shaft is operating. Thus, an extremely high accuracy torque measuring system with a simple implementation is provided.

More specifically, the present invention includes a dual parameter optical sensor that measures changes in magnetic field strength related to and resulting from changes in gear tooth position and temperature, and thus provides a very accurate measurement of the shaft torque. The sensor employed in the present invention is based upon Faraday rotation in a magneto-optic material. In such a material, the Faraday rotation at the saturation magnetization level varies with temperature. In other words, the polarization change introduced by magnetic saturation of the magneto-optic material is dependent upon temperature. This provides a convenient method for compensating for temperature variations in a shaft torque measuring mechanism. The shaft torque measuring mechanism includes a set of discrete sensible discontinuities provided on both the torque applying shaft and on a sleeve connected to the shaft at a predetermined distance from the discontinuities provided on the shaft. The discontinuities provided on the sleeve are located adjacent to the discontinuities of the shaft. These two sets of discontinuities are positioned so as to intermesh with each other, and a sensor is provided to detect their passage. As the meshed discontinuities are rotatingly moved past the sensor position, the magnetic field changes and this in turn causes the field polarization state to vary. The phase change between zero crossings of the signal of the magnetic sensor output is directly related to the twist of the shaft while the absolute magnitude of the output signal is directly related to temperature.

The sensor of the present invention includes a magneto-optic material. In a magneto-optic material, the application of a magnetic field results in the rotation of the polarization of light passing through the material. In particular, the present invention involves a sensor utilizing optical Faraday rotation of a magneto-optic material such as a yttrium-iron-garnet (YIG) material. Such materials, when subjected to a magnetic field, rotate the linear polarization vector of light as a function both of the strength of the magnetic field and the optical path length within the material. The linear polarization vector of a light beam subjected to a magnetic field and passing through a Faraday material undergoes a rotation that results from the coupling between the electric field vectors of the "photons" and the electric field vectors of the magnetically aligned atoms of the Faraday material. As the magnetic flux in the Faraday material is changed, the degree of alignment of the atoms in the material changes, which causes the net coupling efficiency of the electric field vectors to change, thus causing the net rotation of the polarization of the light beam to also change.

The present invention includes a system for measuring torque applied to a rotating shaft which comprises a mechanism, responsive to rotation of the shaft, for providing an output signal. The signal has a first component related to temperature and a second component related to twisting of the shaft. A further mechanism is provided for processing the first and second components of the output signal to provide a temperature compensated signal representing the torque applied to the shaft. The output signal providing mechanism includes a magneto-optic material, such as a Faraday material. In the torque measuring system of the invention, the first component of the output signal is defined by a device for producing a magnetic field exceeding the magnetic saturation level of the Faraday material and the second component of the output signal is defined by a device for producing a magnetic field and for modulating the magnetic field. The device for modulating includes members coupled for rotation with the shaft and further includes a pair of toothed members. The pair of toothed members comprises a pair of gear-like members, each gear-like member having spaced teeth, the spaced gear teeth of the respective gear-like members defining a relationship therebetween.

The output signal providing mechanism according to the invention comprises a source of light, a Faraday film and a mirror positioned so that light from the source passes through the film and is reflected by the mirror to again pass through the Faraday film. The output signal providing mechanism also comprises a polarizer for rotating the linear polarization vector of light passing through the rotating device. The rotating device, according to a preferred feature of the invention, provides for rotating the linear polarization vector of the light by an angle of 45° at a predetermined temperature. The output signal providing mechanism includes a Faraday material, a device for producing a magnetic field within the Faraday material and a further device for moving a ferrous metal with respect to the Faraday material. The device for moving comprises a mechanism for causing the polarized vector of light passing through the Faraday material to be modulated as a function of the magnetic field produced within the Faraday material.

The torque measuring system of the present invention also includes a pair of gears having gear teeth defining a displacement relationship and mounting the pair of gears to rotate with the shaft. The pair of gears comprise first and second gear-like members, with the first gear-like member mounted to the shaft at a first position, the second gear-like member mounted to the shaft at a second position, and the second position is spaced along the axis of the shaft by a predetermined distance from the first position. The moving device can include means securing a plurality of ferrous metal elements for rotation with the shaft. In the alternative, a modulating device can be provided and the modulating device can include securing a plurality of ferrous metal elements for rotation with the shaft.

According to a further feature of the present invention, a method of measuring torque applied to a shaft is provided. The method includes providing a source of light, positioning a magneto-optic material near the shaft, subjecting the material to a magnetic field, modulating the magnetic field, passing light from the source through the material, and processing the light passing through the material to obtain a temperature compensated value of the torque applied to the shaft. Processing the light can include deriving a shaft temperature value from the absolute magnitude of the Faraday rotation of the magneto-optic material, deriving a shaft twist value from the modulation of the magnetic field, and utilizing the temperature value to modify the twist value to obtain the temperature compensated torque value. Moreover, modulating the magnetic field includes providing a ferrous metal for movement in conjunction with the shaft, and moving the ferrous metal with respect to the magneto-optic material. Passing light through the material includes providing a mirror adjacent to a surface of the material and reflecting the light passing through the material so as to cause the light to pass through the material twice.

Subjecting the material to a magnetic field, according to the invention, includes providing a magnetic field having a strength above that of the saturation level of the material. Processing the light includes determining the rotation of the polarization vector of the light passing through the saturated material. Passing light through the material includes positioning a dichroic mirror in the path of the light emanating from the source. Positioning a magneto-optic material includes selecting a magneto-optic material that, under the action of saturating magnetic field, will rotate the polarization vector of light by an angle sufficient to provide modulation at a predetermined temperature.

Providing a ferrous metal includes arranging the ferrous metal to define a displacement relationship. Processing the light passing through the magneto-optic material includes deriving a reference value representing system losses and utilizing the reference value to obtain the temperature value.

An even further feature of the present invention provides a sensor for measuring torque applied to a shaft. A source of light and a mechanism for rotating the polarization vector of light from the source are provided. A device for subjecting the rotating mechanism to a saturating magnetic field and for modulating the magnetic field in correspondence with rotation of the shaft is also provided. In response to the rotation of the polarization vector and the modulation of the magnetic field, a device for producing a signal representing the rotation and the modulation is provided. The signal produced is processed to provide an output representative of the temperature compensated torque applied to the shaft. The rotating mechanism comprises a magneto-optic material.

The sensor of the present invention provides for measuring the absolute magnitude of the rotation of the polarization vector of light from the source by the magnetically saturated rotating mechanism and for measuring the modulation of the magnetic field caused by the rotation of the shaft. The rotating mechanism comprises a device for polarizing light disposed in the path of the light from the source. The modulating mechanism provides for moving ferrous metal with respect to the rotating mechanism. Further processing of the signal includes processing the signal to provide a temperature dependent first output and to provide a torque dependent second output and further includes modifying the second output by the first output.

According to a yet further feature of the invention, a ring magnet is disposed adjacent to the rotating mechanism, and the processing of the signal includes an electronic processor. The signal produced by the signal producing device is an optical signal. Measuring the absolute magnitude of the rotation of the polarization vector includes detecting and holding the peak value of the rotation.

BRIEF DESCRIPTION OF THE DRAWINGS

The invention is further explained in the detailed description which follows, with reference to the drawings, by way of a non-limiting example of the preferred embodiment of the invention, in which like reference numerals represent similar parts in the following Figures, and wherein:

FIG. 1 is a schematic view of a signal flow diagram and shaft sensor of the present invention; and FIG. 2 is a schematic representation of the torque and reference gear teeth and their relationship.

DESCRIPTION OF THE PREFERRED EMBODIMENTS

With detailed reference to the drawings, and in particular with reference to FIG. 1, there is illustrated, in schematic form, a preferred embodiment of the present invention. In FIG. 1, the rotating shaft 70, has torque applied to it by a non-illustrated apparatus in the form of a schematically illustrated moving means 72. The torque applied to the shaft is the parameter to be measured by the present invention.

The torque measuring device of the invention includes a source of light 20, which can be either an LED or a laser emitting a light beam having a moderately broad wavelength band. The light from the light source 20 is conveyed by a fiber optic cable 22 to a lens 26, which serves to focus the light beam. Next, the now focused light beam passes to a dichroic mirror 28 which acts as a high pass filter, reflecting some of the light (with lower wavelengths) back through the lens 26, while permitting light having higher wavelengths to pass through the mirror and to be polarized by the polarizer 30 which is provided in the path of the light beam immediately after the mirror.

The light passing through the polarizer 30, now polarized to a predetermined angle, is then passed through a magneto-optic Faraday film material 34. The preferred form of the magneto-optic material according to the embodiment of the present invention is YIG (yttrium-iron-garnet) material that has the property of changing the polarization angle of the light passing therethrough. According to a feature of the present invention, the rear of the YIG material is provided with a mirrored surface 36 which serves to reflect the light beam back through the material. Thus, by passing the light beam through the material twice, the length of the light path through the magneto-optic Faraday film material is doubled. Thus, the light angle changing effect of the magneto-optic material is doubled. In the alternative, a separate mirror can be positioned adjacent the rear surface of the Faraday material 34.

The magneto-optic Faraday film material of the present invention is positioned within a ring or doughnut magnet 32 which provides a magnetic field about the Faraday film that is near the saturation level of the film material. For example, a magnetic field on the order of 1000–1500 Gauss can be applied by the magnet 32. This level is substantially above the saturation level of the Faraday film material. The Faraday film material 34 is positioned directly adjacent to the rotating shaft 70.

As can be seen in FIG. 1 and as will be explained more thoroughly with respect to FIG. 2, the rotating shaft is provided with two gear-like members 38 and 42 attached thereto at spaced locations along the axial length of the shaft. Each of these gear-like members is provided with discrete sensible formations similar to spaced gear teeth. The teeth intermesh with a spacing greater than the deflection that would occur for maximum shaft twist under load.

As previously set forth, a portion of the light (i.e., that having lower wavelengths) from the source 20, conveyed by the fiber optic cable 22 and focused by the lens 26, is reflected back by the dichroic mirror 28. The reflected back portion of the light passes through the lens 26 again and is conveyed by a second fiber optic cable 24 to a further dichroic mirror 46 and then by a further fiber optic cable 48 to a first detector 50. This portion of the light reflected by mirrors 28 and 46 and conveyed to the detector 50 is used to establish a reference datum for the signal processing circuit of the sensing mechanism disclosed herein. This reflected portion of the light, having a particular range of wave lengths, is not subjected to polarization by the polarizer 30 or to rotation by the Faraday film 34. Neither is this portion of light affected by the magnetic field of the magnet 32 nor by the rotation of the gear teeth of the shaft 70. These lower wavelengths of light, reflected by mirrors 28 and 46, serve as a reference value and enables the sensor processing circuit of the present invention to compensate for losses resulting from the variable intensity of the source 20, or from the connectors and the fiber optic cables 22.

The remainder of the light, i.e., that having wavelengths above that of the light that is reflected by the mirror 28, is transmitted through the mirror 28. This remaining portion of the light from source 20 is polarized by the polarizer 30, transmitted through the Faraday film material 34, reflected by the mirror 36, again transmitted through the Faraday material 34 and then out through the polarizer 30, the dichroic mirror 28, and finally through the lens 26.

This light is also conveyed, by the fiber optic cable 24, to the dichroic mirror 46 where, unlike the previously discussed reference establishing light pulse that was reflected by the mirror 46, the wavelengths of light that have been rotated by passage through the Faraday film material are again transmitted through the dichroic mirror 46 and finally arrive at a second detector 52.

Both of the detectors 50 and 52 are essentially similar and are in the form of photodetectors of a conventional nature. These detectors serve merely to convert the optic energy signal pulses arriving through the fiber optic cables 67 and 48, respectively, into corresponding electrical signals. Thus, the electrical signal emanating from the photodetector 50 is a reference signal representative of the losses within the fiber optic system itself, while the electrical signal emanating from the photodetector 52 is the signal from the sensor of the present invention, which has had the intensity vector rotated by the Faraday film 34. Each of the electrical signals from the detectors 50 and 52 is then amplified by conventional amplifiers 54 and 56. After being appropriately amplified, both of these signals are conveyed to the multiplexer 58. The multiplexer 58 sequentially operates on each of the signals from the amplifiers 54 and 56. Each of these signals is passed from the multiplexer 58 to the peak detector 60 which operates in a manner similar to a sample and hold circuit and measures the amplitude of each incoming signal (reference and sensor) and outputs the peak amplitudes a conventional analog to digital (A/D) convertor 62. The peak amplitude signals, after conversion to digital form, are then transmitted to the microprocessor 66 where they are stored in appropriate form and serve to correct for the temperature of the rotating shaft. The manner in which these signals serve as a correction for the shaft temperature will be discussed below.

The optic signal transmitted through the dichroic mirrors, passed through the magneto-optic Faraday film and then converted to an electrical signal by the photodetector 52 and amplified by the amplifier 56 is conveyed from the amplifier 56 to a conventional signal processing circuit 64. The signal input to the circuit 64 is a modulated sine wave function which results from the sequential passing of the teeth of the gears provided on the shaft 70 and sleeve into and out of proximity to the magnetic field set up by the ring magnet 32 positioned adjacent to the magneto-optic material 34. From this modulated sine wave, shaft twist is determined by the circuit 64, using the timing pulses generated by the passing gear teeth attached to the shaft and sleeve. Thus, the phase difference between two adjacent pulses is directly related to the twist experienced by the shaft as a result of the torque applied thereto. The manner in which the circuitry 64 operates to process the signal input thereto and to derive therefrom a measure of the torque applied to the shaft is similar to a conventional magnetic sensor monopole system. Such circuitry is disclosed in U.S. Pat. No. 4,590,806 (LUTTON et al.), the entire disclosure of which is expressly incorporated herein by reference and which discloses a monopole torque sensor and which utilizes zero crossover of the sensor output to derive a digital signal for further processing. The signal output from the circuitry 64, which is directly proportional to the twist of the shaft and hence to the torque applied thereto, is fed into a microprocessor 66 which has, as an additional input thereto, the output from the above discussed analog to digital convertor 62. As noted above, the signal output from the analog to digital convertor 62 is representative of the temperature of the shaft. Within the microprocessor 66, data is stored in the form of a "look-up" table that relates the signal from the analog to digital convertor 62 to a specific temperature. The signal from 62 and the "look-up" table are thus utilized to compensate for the change in YOUNG'S modulus of elasticity due to temperature variations. Thus, the resultant output from the microprocessor 66 is a torque measurement signal which has been compensated by the output signal of the convertor 62, for the effect of temperature upon the measured value of the torque applied to the shaft.

Thus, according to a significant feature of the present invention, the phase difference between adjacent pulses of the modulated sine wave signal is related to the twist occurring in the shaft as a result of the torque applied thereto. On the other hand, the temperature at which the shaft is operating can be predicted by the angle of rotation of the intensity vector of the light passing through the Faraday film when the Faraday film is subjected to magnetization above the saturation level of the Faraday film, as will be discussed below. Obviously, the saturation magnetization level of a Faraday film depends on the physical properties of the material itself, and thus the choice of an appropriate material and magnetization level applied thereto are related variables and are within the realm of skill of a routineer in this field.

When a Faraday material is subjected to a magnetic field, the light passing through the material will have its intensity vector subjected to a predetermined rotation. However, when the magnetic field rises above a particular strength, i.e., above the saturation level of the particular material, no further rotation of the intensity vector of the film will occur. For a given material, the rotation at the saturation level varies in direct correspondence to the temperature. Thus, by saturating the material, which is performed in the present invention by the ring magnet provided thereabout, saturation is forced and from the known properties of the material, a rotation of the light intensity vector that is directly related to temperature will be achieved. Thus, the optical signal output through the line 24 will vary with the maximum amplitude depending upon the amount of rotation undergone by the light as a result of its being twice passed through the magneto-optic Faraday material. Since the angle of rotation of the light intensity caused by the film at saturation varies with temperature, as the temperature and the saturation level rise, the angle of the light output therefrom also changes. Since the magnetic saturation level is provided by the magnet, the rotation at the saturation level, which changes with temperature, is an easily measurable quantity that can be utilized as a temperature correction for the torque measuring system disclosed herein.

The intensity of the light reflected through the magneto-optic Faraday film material and out through the light fiber cable 24 has been found to vary in accordance with the following relation:

$$I=(I_o/4)\cos^2[2(\Theta_s-\Delta\Theta_T)+2\Delta\Theta_m]$$

The first term within the bracket represents the static component of the intensity signal (temperature related), while the second term represents the dynamic component of the intensity signal (twist related) and $I_O/4$ is a scaling factor. The static intensity signal component is expressed as the difference between a reference, $\theta_s$, which is the static Faraday rotation at 25° C., and $\Delta\Theta_T$ which is the rotation due to changes in the operating temperature. This difference is not affected by the rotation of the gear teeth with respect to the magnetic field. The dynamic component of the intensity is generated by the gears of the shaft (and sleeve) sequentially passing into and out of the magnetic field and represents the twist of the shaft under the applied torque load. Thus, the static component of the intensity represents the temperature at which the system is operating, and the dynamic component (modulation of the field) represents the twist.

The above equation can be optimized for a situation where the film thickness is selected so that $\Theta_S$ is equal to 45° at 26° C. Since, in the above equation, $\Theta_S$ is doubled, this results in a angle of 90°. At 90°, the slope of the cosine wave is at its maximum. Thus, any changes about this reference point therein are very easy to detect. Hence, a system utilizing $\Theta_S$ equal to 45° as a starting value for the Faraday rotation optimizes the sensitivity of the system and enables changes therein to be very readily measured with extreme accuracy.

In an illustrative example, taking $\Theta_S=45°$ at a temperature of 26° C. and a value of $\Delta\Theta_T=27°$ at a temperature of 200° C., for a change in temperature of 174° C., the ratio of the intensity of light at 26° C. to the intensity of light at 200° C. is equal to 0.65. Thus, a change in light intensity of approximately 1.9% per a 5° C. temperature change is observed.

By providing a "look-up" table within the processor 66 that relates the digital signal emanating from the converter 62 to the temperature of the system, a temperature-based correction is obtained which can be combined with the signal from the circuit 64 to obtain a very accurate measurement of the torque applied to the shaft.

With reference to FIG. 2, a schematic representation of the torque and reference gear teeth defining a displacement relationship is illustrated. The shaft 70 has a torque gear 42 attached thereto at a predetermined position along its axial length. The torque gear 42 is provided with a plurality of gear teeth 40 equally spaced about the periphery of the torque gear 42. A reference sleeve is attached to the shaft 70 at a position (not shown) a predetermined distance from the torque gear 42. The reference sleeve extends along the axial length of the shaft so that the end thereof opposite its attachment end is directly adjacent to the torque gear 42. The end of the reference sleeve adjacent to the torque gear 42 is provided with, or formed as, a reference gear 38. The reference gear 38 is provided with a series of equidistantly spaced gear teeth.

The teeth of the reference gear 38 and of the shaft torque gear 42 are adjacent to each other and intermesh (i.e. the tooth of one gear is positioned in the space between adjacent teeth on the other gear). As the torque load on the shaft operates to twist the rotating shaft over its length, the relationship between the two sets of gear teeth will change. Thus, as one gear moves with respect to the other gear due to twist of the shaft, the space between the adjacent teeth of the adjacent gears will change accordingly. This is referred to herein as a displacement relationship.

A single, i.e., monopole, sensor or detector near the interface of the two gears can detect the amount of displacement of the teeth on the shaft (torque) and sleeve gears each pair of gears as they pass the sensor. In the present invention, the change in spacing between the teeth is detected by the modulation of the light by the Faraday material provided adjacent to the rotating gear-like members. Thus, the sensor output pulse train resulting from the passage of the spaces between gear teeth exhibits a variation depending upon the torque applied to the shaft and the twist resulting therefrom. The processing means 64 utilized herein is operative to measure the displacement between gear teeth. The angular displacement of the teeth is thus measured with respect to the displacement between adjacent teeth and the transmitted torque is calculated from such a measurement. As the torque on the shaft varies, the thus measured angular displacement parameter will change, and the processing means can provide an immediate reading of such torque variations.

In the present invention, the sensor is a magneto-optic Faraday material which rotates the polarization vector of light passing therethrough. The polarization vector of the light is rotated as a function of the magnetic field applied to the Faraday material. Thus, when the Faraday sensor is in close proximity to a magnet, the magnetic field in the Faraday film is increased, thus increasing the rotation of the linear polarization vector of the light by the Faraday material. However, when the magnet is removed, the field in the Faraday material is decreased. Accordingly, the rotation of the polarization vector of the light passing through the Faraday material is also decreased. In the structure discussed above, where the sensor and the magnet positioned adjacent thereto are in close proximity to a ferrous material such as a gear tooth, much of the flux from the magnet will be directed away from the Faraday material and through the ferrous metal of the gear tooth. This will decrease the magnetic field within the Faraday material, thus decreasing the rotation of the polarization vector of the light passing therethrough. However, when the ferrous material is removed, as when the gear tooth rotates away from direct adjacency to the sensor, the field in the Faraday material increases, again increasing the rotation of the polarization of the light. This causes the output through the sensor to be in the form of a modulated sine wave.

The electrical or electronic processing of the modulated sine wave can take any conventional form. For example, the electrical output of the Faraday film sensor may be viewed as corresponding to a time differential of the passing tooth pair with the leading edge of the tooth pair providing a positive going pulse and the trailing edge of the tooth pair providing a negative going pulse. Conventional signal conditioning circuits are known that can detect such pulses (and/or zero crossings therebetween) and provide more standardized outputs for input to the processing circuit, as will be appreciated by one of skill in the art. One such exemplary circuit is shown in U.S. Pat. No. 3,548,649 (PAR- KINSON), the entire disclosure of which is expressly incorporated herein by reference.

As will be readily understood, the torque and reference gears can be configured such that the interface between the two gears attached thereto may be positioned to face in any convenient direction, allowing the sensor to be located in areas most convenient for the equipment being monitored or controlled.

The processor 66, as will be appreciated by those skilled in the art, can also provide appropriate corrections to compensate for other variations in modulus of elasticity and/or other system parameters that might affect the degree of shaft twisting as a function of the transmitted torque.

While the invention has been described in its preferred embodiments, it is to be understood that the words which have been used herein are words of description rather than words of limitation. Changes may be made within the purview of the appended claims without departing from the scope and spirit of the invention in its broader aspects. Although the invention has been described herein with reference to particular means, materials and embodiments, it is understood that the invention is not to be limited to the particulars disclosed herein, and that the invention extends within all equivalents within the scope of the appended claims.

We claim:

1. A system for measuring torque applied to a rotating shaft, said system comprising:
   means, responsive to rotation of the shaft, for providing an output signal, said signal having a first component related to temperature and a second component related to twisting of the shaft; and
   means for processing said first and second components of said output signal for providing a signal representing the torque applied to the shaft that is compensated for temperature related change in Young's Modulus of the shaft.

2. A torque measuring system according to claim 1, wherein said output signal providing means includes a light source, a magneto-optic material, and means for producing and modulating a magnetic field.

3. A torque measuring system according to claim 2, wherein said first component of said output signal is defined by said magnetic field producing a magnetic field exceeding the magnetic saturation level of said magneto-optic material.

4. A torque measuring system according to claim 2, wherein said second component of said output signal is defined by said magnetic field means and means for modulating said magnetic field.

5. A torque measuring system according to claim 4, wherein said means for modulating is coupled for rotation with the shaft.

6. A torque measuring system in accordance with claim 4, wherein said means for modulating includes a plurality of ferrous metal elements that rotate with the shaft.

7. A torque measuring system according to claim 5, wherein said means for modulating comprises a pair of toothed members.

8. A torque measuring system according to claim 7, wherein said pair of toothed members comprise a pair of gear-like members, each gear-like member having spaced teeth, said spaced teeth of said gear-like members defining a displacement relationship.

9. A torque measuring system in accordance with claim 2, wherein said magneto-optic material comprises means for rotating the polarization vector of light under the action of a saturating magnetic field by 45° at a predetermined temperature.

10. A torque measuring system according to claim 1, wherein said output signal providing means comprises a source of light, means for producing and modulating a magnetic field, a magneto-optic material and a mirror positioned so that light from said source passes through said magnetic-optic material and is reflected by said mirror to again pass through said magneto-optic material.

11. A torque measuring system in accordance with claim 10, wherein said magneto-optic material and magnetic field means comprise means for rotating the linear polarization vector of light passing through said rotating means.

12. A torque measuring system in accordance with claim 11, wherein said rotating means comprises means for rotating the linear polarization vector 45° at a predetermined temperature.

13. A torque measuring system in accordance with claim 1, wherein said output signal providing means includes a magneto-optic material, means for transmitting light through said magneto-optic material, means for producing a magnetic field through said magneto-optic material and means for moving a ferrous metal with respect to said magneto-optic material.

14. A torque measuring system in accordance with claim 13, wherein said output signal providing means causes the polarization vector of light passing through said magneto-optic material to be modulated as a function of said magnetic field.

15. A torque measuring system in accordance with claim 14, and further comprising means causing light to pass through said magneto-optic materail twice.

16. A torque measuring system in accordance with claim 13, wherein said moving means comprises a pair of gear-like members having gear teeth defining a displacement relationship and means mounting said pair of gear-like members to rotate with said shaft.

17. A torque measuring system in accordance with claim 16, wherein said pair of gear-like members comprise first and second gear members, said first gear member mounted to the shaft at a first position, said second gear member mounted to the shaft at a second position, said second position spaced along the axis of the shaft by a predetermine distance from said first position.

18. A torque measuring system in accordance with claim 13, wherein said moving means includes a plurality of ferrous metal elements that rotate with the shaft.

19. A temperature compensated method of measuring the torque applied to a rotating shaft, said method comprising the steps of:
   applying torque to the shaft causing torsional deformation thereof;
   positioning a magneto-optic material adjacent to the shaft,
   subjecting the material to a saturating magnetic field,
   modulating the magnetic field in accordance with torsional deformation of the shaft,
   passing light from a source through the material, and
   processing the light passing through the material to obtain a temperature compensated value of the torque applied to the shaft.

20. A torque measuring method according to claim 19, wherein processing said light comprises deriving a shaft temperature value from the absolute magnitude of the Faraday rotation of the light caused by passing the light through the magneto-optic material;

deriving a shaft twist value from the modulation of the magnetic field; and utilizing the temperature value to modify the twist value to obtain the temperature compensated torque value.

21. The torque measuring method of claim 19, wherein modulating the magnetic field comprises providing a ferrous metal for movement in conjunction with the shaft, and moving the ferrous metal with respect to the magneto-optic material.

22. The torque measuring method of claim 19, wherein the passing of light through the material comprises providing a mirror adjacent a surface of the material and reflecting the light passing through the material so as to cause the light to pass through the material twice.

23. The torque measuring method of claim 21, wherein the providing of a ferrous metal comprises arranging the ferrous metal to define a displacement relationship.

24. The torque measuring method of claim 19, wherein processing the light includes determining the rotation of the polarization vector of the light passing through the saturated material.

25. The torque measuring method of claim 19, wherein passing of light through the material comprises positioning a dichroic mirror in the path of the light emanating from the source.

26. The torque measuring method of claim 19, wherein positioning of a magneto-optic material comprises selecting a magneto-optic material that, under the action of a saturating magnetic field, will rotate the polarization vector of light by 45° at a predetermined temperature.

27. The torque measuring method of claim 19, wherein the step of processing the light passing through the magneto-optic material includes the step of deriving a reference value representing system losses and utilizing the reference value to obtain the temperature value.

28. A sensor for measuring torque applied to a rotating shaft comprising:

a source of light;

means for rotating the polarization vector of light from said source;

means for subjecting said rotating means to a saturating magnetic field;

means for modulating said magnetic field in correspondence with rotation-related torsional deformation of the shaft;

means responsive to the rotation of the polarization vector and modulation of the magnetic field for producing a signal representative of the rotation and the modulation;

means for processing said signal produced by said signal producing means to provide a temperature compensated output representative of the torque applied to the shaft.

29. A sensor in accordance with claim 28, wherein said rotating means comprises a magnetic-optic material.

30. The sensor of claim 28, wherein said means for producing a signal comprises means for measuring the absolute magnitude of the rotation of the polarization vector of light from the source by the magnetically saturated rotating means and means for measuring the modulation of the magnetic field by the rotation of the shaft.

31. The sensor according to claim 30, wherein said means for measuring the absolute magnetic of the rotation of the polarization vector comprises means for detecting and holding the peak value of the rotation.

32. The sensor of claim 28, wherein said rotating means comprises means for polarizing the light disposed in the path of light from said source.

33. The sensor according to claim 28, wherein said means for modulating comprises means for moving a ferrous metal with respect to said rotation means.

34. The sensor according to claim 28, wherein said processing means comprises means for processing said signal to provide a temperature dependent first output and to provide a twist dependent second output and further comprising means for modifying said second output by said first output.

35. A sensor in accordance with claim 28, wherein said subjecting means comprises a ring magnet disposed adjacent to said rotating means.

36. A sensor according to claim 28, wherein said processing means comprises an electronic processor.

37. A sensor according to claim 28, wherein said signal produced by said signal producing means comprises an optical signal.

* * * * *